United States Patent [19]

Corpora et al.

[11] Patent Number: 5,491,731
[45] Date of Patent: Feb. 13, 1996

[54] METHOD AND SYSTEM FOR MAINTAINING PRESSURE IN A NUCLEAR POWER PLANT PRIMARY LOOP DURING STARTUP OR SHUTDOWN

[75] Inventors: Gary J. Corpora, Monroeville; Thomas G. Bengel, Plum Borough; Elwyn L. Cranford, III, Greensburg, all of Pa.

[73] Assignee: Westinghouse Electric Corporation, Pittsburgh, Pa.

[21] Appl. No.: 270,273

[22] Filed: Jul. 5, 1994

[51] Int. Cl.⁶ ..................................... G21C 7/00
[52] U.S. Cl. ............................ 376/307; 376/214
[58] Field of Search .................... 376/307, 247, 376/214; 165/104.32, 104.27

[56] References Cited

U.S. PATENT DOCUMENTS

| | | | |
|---|---|---|---|
| 4,470,948 | 9/1984 | Aanstad et al. | 376/216 |
| 4,588,548 | 5/1986 | Magee et al. | 376/307 |
| 4,692,297 | 9/1987 | Schlonski et al. | 376/307 |
| 4,717,532 | 1/1988 | Schwab | 376/307 |
| 4,728,486 | 3/1988 | Kish | 376/307 |
| 5,126,100 | 6/1992 | Bengel et al. | 376/307 |

*Primary Examiner*—Daniel D. Wasil

[57] ABSTRACT

An automated method for maintaining pressure within a nuclear power plant primary loop during either startup or shutdown, the method comprises the steps of partially filling a portion of a pressurizer vessel, in fluid communication with the primary loop, with a liquid for maintaining pressure in the primary loop; circulating a primary coolant through the primary loop; automatically injecting an inert gas by a first automated device, operatively connected to the pressurizer, into the pressurizer vessel when the pressure in the pressurizer vessel is less than a first predetermined pressure; and automatically venting the gas by a second automated device, operatively connected to the pressurizer, from the pressurizer vessel when the pressure in the pressurizer vessel is greater than a second predetermined pressure.

7 Claims, 2 Drawing Sheets

METHOD AND SYSTEM FOR MAINTAINING PRESSURE IN A NUCLEAR POWER PLANT PRIMARY LOOP DURING STARTUP OR SHUTDOWN

Field of the Invention

The present invention relates generally to a method and system for maintaining pressure in a nuclear power plant primary loop having a pressurizer vessel operatively attached to it for maintaining pressure in the primary loop and, more particularly, to such a method and system which automatically inject nitrogen into and vent nitrogen from the pressurizer vessel for maintaining the pressure in the primary loop during startup and shutdown which, in turn, eliminates temperature gradients between the pressurizer vessel and the primary loop or laborious methods caused by presently known and utilized methods and apparatuses.

Description of the Related Art

A typical nuclear power facility includes a nuclear reactor wherein a controlled nuclear reaction, which generates heat, is occurring. Typically, borated water is contained in the reactor for controlling the nuclear reaction process and for passing the generated heat away from the reactor. A primary loop communicating with the reactor functions to pass the borated water (i.e., the heat) away from the reactor and to transfer the heat to a secondary loop. A reactor coolant pump is attached to the primary loop for pumping the borated water through the primary loop. The primary loop then returns the borated water back into the reactor where the above described process is repeated. The secondary loop is isolated from the primary loop and generates steam from the heat passed from the primary loop. The steam of the secondary loop is used to produce electricity as is well known in the art.

A pressurizer vessel is connected to the primary loop for maintaining a constant pressure in the primary loop. The pressurizer vessel includes a protective shell forming an interior portion for containing any water and steam therein. The protective shell includes a cylindrical shaped side terminating at a hemispherical shaped head at both its top and bottom end, with the bottom end attached to a cylindrical support skirt. A flange extends radially from the skirt bottom for attaching it to its support structure, typically a floor. A nozzle at the bottom of the lower hemisphere connects to piping which attaches to the primary loop for allowing the primary loop and the pressurizer vessel to pass the borated water therebetween which, in turn, functions to maintain proper pressurization of the primary loop. A heater support plate is located in a lower portion of the shell interior for receiving a plurality of electrical heaters which, during plant operation, are turned on to further heat the water or to maintain the water at a constant temperature. A spray nozzle is positioned at an upper portion of the shell interior for spraying water in the shell interior which condenses the steam back to water.

During operation of the power plant, a transient event that could decrease system pressure, for example, is counteracted by increasing the water temperature via the electrical heaters which, in turn, causes a portion of the water to flash to steam. An increasing pressure transient is limited by spraying cooler water from the primary loop via the spray nozzle into the shell interior which, in turn, causes a portion of the steam to condense to water.

During startup and shutdown of the nuclear power generating process, there are presently two known and utilized methods and systems for maintaining the pressure in the primary loop, which is necessary to allow the reactor coolant pumps to properly operate. Using the first method and system during startup, the heaters are energized for heating the borated water in the pressurizer which, in turn, creates the necessary pressure in the primary loop for allowing the reactor coolant pumps to be operated. The reactor coolant pumps are started in conjunction with the heat production process of the heaters for thoroughly mixing the borated water contained in the reactor vessel and the primary loop. Obviously, mixing is necessary for maintaining all of the borated water at a constant temperature for eliminating temperature gradients. Once the primary loop is pressurized, the reactor vessel begins its heat producing process for initiating the power production process, as described hereinabove. The reactor vessel then brings the borated water up to its operating temperature, and the normal operational procedure is started.

Using first method and system during shutdown, the reverse procedure for startup is used. Obviously, the normal operating procedure is in process, and to initiate shutdown of power generating process, the reactor vessel gradually ceases its heat production process. However, to dissipate the heat of the borated water, the primary loop continues to circulate through the primary loop and, more particularly, to the steam generator for passing and dissipating the heat of the primary coolant to the secondary loop. This circulation requires the reactor coolant pumps to be in operation which, in turn, requires pressurization of the primary loop. This pressurization is maintained by energizing the pressurizer heaters for heating the borated water therein. After the primary heat of the primary loop is substantially dissipated, the reactor coolant pumps are turned off which, in turn, obviates the need for pressurization of the primary loop.

Although the presently known and utilized method and device for starting up and shutting down the power generating process are satisfactory, they are not without drawbacks. One drawback is that a temperature gradient exists between the borated water in the pressurizer (i.e., created by the pressurizer heaters for pressurization of the primary loop) and the borated water in the primary loop. This, in turn, causes the pressurizer and the primary loop to have a temperature gradient between them, which causes thermal loads and stresses on these components and their interconnections.

To eliminate this temperature gradient, a second known and utilized device eliminates the need for pressurization via the pressurizer heaters and, instead, creates pressurization of the primary loop by inserting and withdrawing nitrogen from the pressurizer vessel. This method and system, however, is performed by manually manipulating valves and the like.

Although this manual method and system is satisfactory, it is not without drawbacks. Manual operation of the valves and the like requires that maintenance personnel be within the containment building which exposes them to low levels of radiation.

Consequently, a need exists for an improved method and system for maintaining pressurization of the primary loop during startup and shutdown.

SUMMARY OF THE INVENTION

The present invention provides an improvement designed to satisfy the aforementioned needs. Particularly, the present invention is directed to an automated method for maintaining pressure within a nuclear power plant primary loop. The method comprises the steps of: (a) partially filling a portion of a pressurizer vessel, in fluid communication with the primary loop, with a liquid for maintaining pressure in the primary loop; (b) circulating a primary coolant through the primary loop; (c) automatically inserting an inert gas by a first automated device, operatively connected to the pressurizer, into the pressurizer vessel when the pressure in the pressurizer vessel is less than a first predetermined pressure; and (d) automatically venting the gas by a second automated device, operatively connected to the pressurizer, from the pressurizer vessel when the pressure in the pressurizer vessel is greater than a second predetermined pressure.

In another broad forms the invention resides in an automated system for maintaining pressure within a nuclear power plant primary loop. The apparatus comprises (a) a pressurizer vessel operatively connected to the primary loop for maintaining pressure in the primary loop; (b) a first valve in pneumatic communication with said pressurizer for sensing the pressure in said pressurizer and for supplying an inert gas into said pressurizer vessel when the pressure sensed by said first valve is less than a predetermined pressure; and (c) a second valve in pneumatic communication with said pressurizer for sensing the pressure in the pressurizer and for venting the inert gas from said pressurizer vessel when the pressure sensed by said second valve is greater than a predetermined pressure.

It is an object of the present invention to provide an improved method and device for maintaining pressure in a nuclear power plant primary loop during startup or shutdown.

This and other objects will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawing in which.

DETAILED DESCRIPTION OF THE PREFERRED EMBODIMENT

Figure 1:
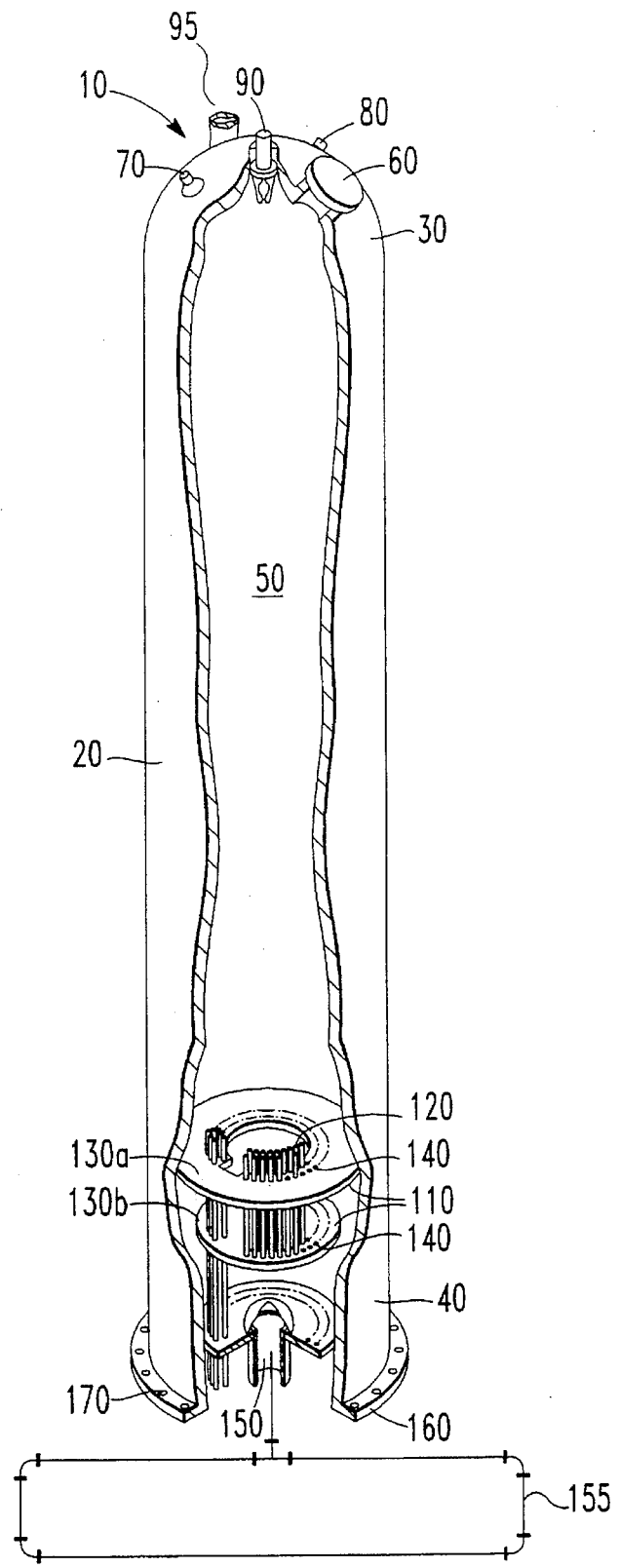
FIG. 1 is a view in side elevation of a pressurizer vessel with a portion cut-away.

In the following description, like reference characters designate like or corresponding parts throughout the several views of the drawings. Also, in the following description, it is to be understood that such terms as "forward," "left," "right," "upwardly," "downwardly," and the like are words of convenience and are not to be construed as limiting terms.

Referring now to the drawings, and more particularly to FIG. 1, there is illustrated a pressurizer vessel, generally referred to as 10, for use in a nuclear power plant as is well known in the art. The pressurizer vessel 10 includes a protective shell 20 having an upper head 30 and a lower head 40 both defining an interior portion 50 for containing any water and steam (not shown) therein. The upper head 30 includes a manway 60 for allowing maintenance personnel and the like to enter the pressurizer vessel 10, and further includes a relief nozzle 70 for venting steam outside the pressurizer vessel 10 to preclude the design pressure of the pressurizer vessel 10 from being exceeded. The relief nozzle 70 is connected to a power-operated relief valve (not shown in FIG. 1) which automatically opens below system design pressure. The power-operated relief valve is programmed to open at a predetermined setpoint and is well known in the art. If system pressure continues to rise, a safety nozzle 80 is included on the pressurizer vessel 10 for piping the steam to a spring-loaded relief valve (not shown) which will open when a predetermined pressure is met. Steam from the safety nozzle 80 or relief nozzle 70 is piped to a pressurizer relief tank (not shown in FIG. 1) which contains sufficient water to condense the steam. A spray nozzle 90 is positioned atop the pressurizer vessel 10 and extends into the shell interior portion 50 for spraying water into the pressurizer vessel 10 which condenses the steam to water. A pipe 95 is attached to the upper head 20 for venting and inserting nitrogen into the pressurizer vessel 10 during startup and shutdown.

A tiered, circular shaped heater support assembly 110 is located in the interior portion 50 of the lower head 40 and is attached to the shell 20 for structural support. The heater support assembly 110 is operable to matingly receive a plurality of electrical heaters 120. The heater support assembly 110 includes two horizontally oriented, spaced apart plates, top plate 130a and bottom plate 130b, each having a plurality of holes 140 which are respectively in registry with each other. Each pair of aligned holes 140 receives an electrical heater 120, typically a total of seventy eight, for heating the water.

A surge nozzle 150 attaches to the bottom of the pressurizer vessel 10 and extends up into the vessel interior 50 for allowing water from the primary loop 155 to flow into and out of the vessel interior 50 for maintaining proper pressurization of the primary loop. A support skirt 160 extends axially downwardly and radially outwardly from the lower head 40 and includes a plurality of holes 170 for attaching the pressurizer vessel 10 to its support structure, typically a floor (not shown).

Figure 2:
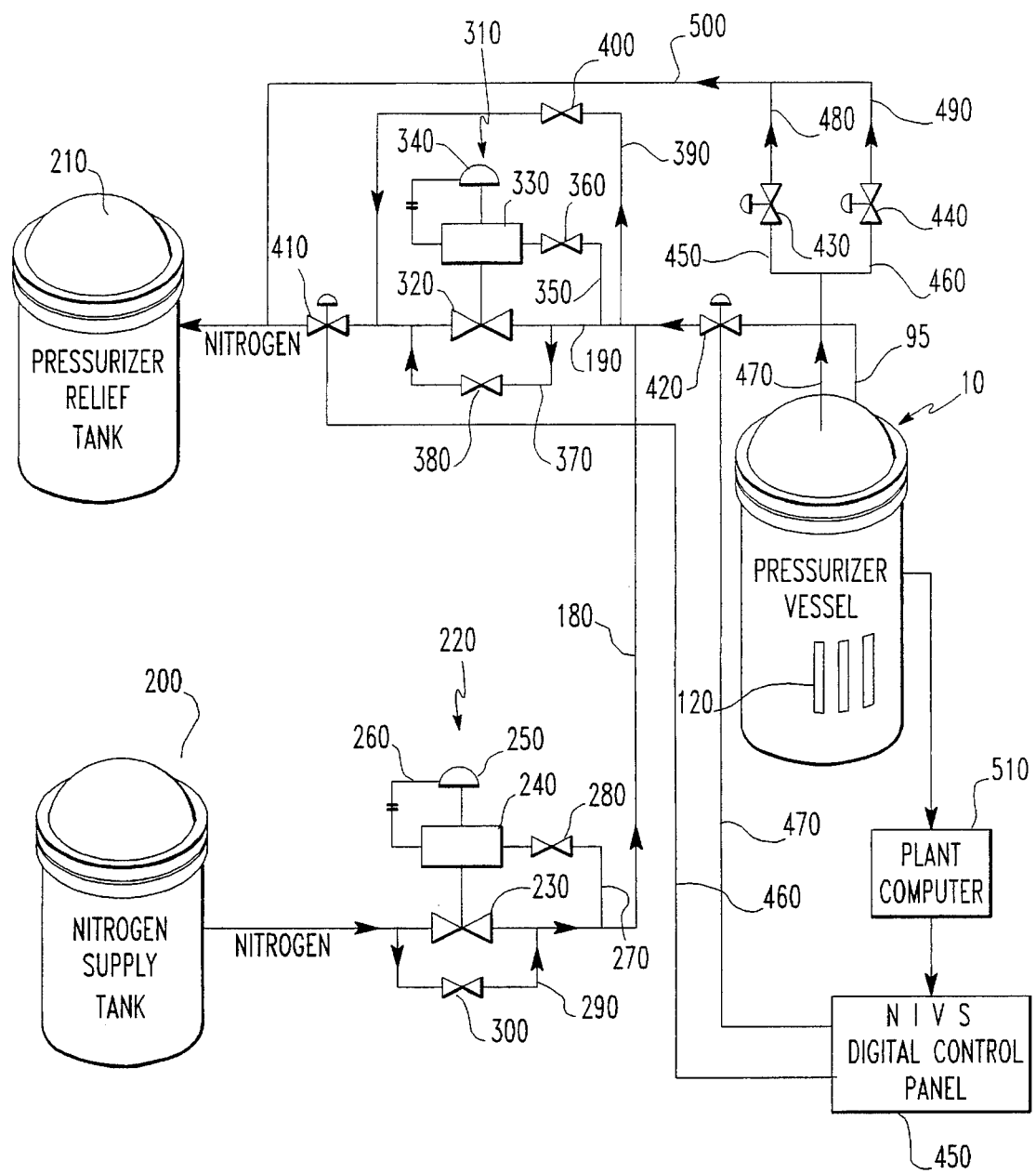
FIG. 2 is a schematic diagram of an automatic system for injecting nitrogen into and venting nitrogen from the pressurizer vessel.

Referring to FIG. 2, a schematic diagram of the present invention is illustrated for automatic injection and ventilation of the nitrogen into and from the pressurizer vessel 10. In this regard, the pipeline 95 is attached to the pressurizer vessel 10 for providing a passageway for the venting of nitrogen from the pressurizer vessel 10 and the insertion of nitrogen into the pressurizer vessel 10. The pipeline 95 extends from the pressurizer vessel 10 and branches into two main and separate portions 180 and 190. One portion 180 extends to a supply tank 200 which supplies nitrogen to the pressurizer vessel 10, and the other portion 190 extends to a pressurizer relief tank 210 which stores the nitrogen vented from the pressurizer vessel 10. It will be obvious to those skilled in the art that nitrogen is inert relative to the pressurizer vessel 10 and the water and steam contained therein.

For supplying nitrogen into the pressurizer 10, as previously stated, the supply tank 200 is operatively connected to the pressurizer 10 via the pipeline 95 and pipe portion 180, and contains the nitrogen which will be injected into the pressurizer vessel 10. A first valve 220 is disposed on the pipeline 180, and opens when the pressure in the pressurizer vessel 10 falls below a pre-selected pressure, 380 psig in this embodiment, and closes when the pressure in the pressurizer vessel 10 is above the preselected pressure. The first valve 220 may be a self-regulating pressure control valve, such as is available from Fisher Controls, which is well known in the art. Such valves typically contain a valve body 230 for providing a structural device for stopping or starting the flow of nitrogen through the first valve 220 and, in turn, the pipe portion 180, a diaphragm 240 operatively connected to the body 230 for sensing the pressure in the pipeline 180, and an air operator 250 operatively attached to both the diaphragm 240 and the body 230 for opening and closing the valve body 230. A pipe 260 connects the air operator 250 and the diaphragm 240. A pipe 270 is positioned between the diaphragm 240 and the pipe portion 180, and includes a manually operated isolation valve 280 thereon for preventing flow of the nitrogen to the diaphragm 240 during such maintenance and the like.

In addition, a bypass pipeline 290 is attached to the pipe portion 180 for supplying a passageway for the nitrogen from the supply tank 200 which circumvents the first valve 220 when the first valve 220 is disabled due to maintenance or the like. The bypass pipeline 290 attaches to the pipe portion 180 respectively at points adjacent the entrance and exit of the nitrogen into and from the first valve 220 for providing this passageway of the nitrogen from the supply tank 200. A manually operated valve 300 is located on the bypass pipeline 290 and is normally closed to prevent the flow of the nitrogen through the bypass pipeline 290 and opened to allow the flow of the nitrogen through the bypass pipeline 290.

For venting nitrogen from the pressurizer vessel 10, as previously stated, a pressurizer relief tank 210 is operatively connected to the pressurizer vessel 10 via the pipeline 95 and pipe portion 190 for receiving the vented nitrogen. A second valve 310 is located on the pipe portion 190, and the second valve 310 opens when a pre-selected pressure, 400 psig in this embodiment, is exceeded in the pressurizer vessel 10, and closes when the pressure in the pressurizer vessel 10 falls below the pre-selected pressure. The second valve 310 may also be a self-regulating valve and includes a body 320, a diaphragm 330, and an air operator 340, all of which is described in detail above. A pipe 350 is positioned between the diaphragm 330 and the pipe portion 190, and includes a manually operated isolation valve 360 for preventing flow of the nitrogen to the diaphragm 330 during such maintenance and the like.

Similarly to the first valve 220, a bypass pipeline 370 is attached to the pipe portion 190 for allowing the flow of nitrogen from the pressurizer vessel 10 to circumvent the second valve 310 during maintenance and the like. The bypass portion 370 is attached to the pipe portion 190 adjacent the entrance and exit of the nitrogen into and from the second valve 310. A manually operated valve 380 is disposed on the bypass pipeline 370 and is normally closed to prevent the flow of the nitrogen through the bypass pipeline 370 and opened to allow the flow of the nitrogen through the bypass pipeline 370.

As a backup feature in case the second valve 310 malfunctions, an additional bypass pipeline 390 is attached to opposite sides of the second valve 310 on the pipe portion 190 for circumventing the flow of nitrogen from the pressurizer vessel 10 through the second valve 310, and includes a spring-loaded safety relief valve 400 for venting the nitrogen from the pressurizer vessel 10 if a predetermined pressure, 410 psig in this embodiment. It will be obvious to those skilled in the art that this predetermined pressure is slightly higher than the pre-selected pressure for the valve 310. The spring-loaded relief valve 400 is well known in the art. The benefit of this type of valve is its passive operation (i.e., no operator or signal is required). The setpoint is selected at a value below that which would open valves 430 and 440 in order to minimize the possibility of actuating the valves 430 and 440, because actuation of the valves results in a rapid depressurization of the primary loop and subsequent tripping of the reactor coolant pumps. This event is highly undesirable to plant operators.

During normal operation of the power plant, the system of the present invention is deactivated or taken off line by automatically closing valves 410 and 420, such as air or motor-operated type valves, which effectively isolates the system from the pressurizer vessel 10 and its safety depressurization system (i.e., valves 430 and 440) which is used during normal operation of the plant and will be discussed later in detail. It is instructive to note that valves 410 and 420 are open during operation of the system of the present invention. The valves 410 and 420 are closed by manually manipulating a digital control panel 450 electrically connected to the valves 410 and 420 respectively via cables 460 and 470. Digital control panels 450 are well known in the art.

To operate the safety depressurization system used during normal operation, the valves 430 and 440, typically power-operated valves, are respectively connected to the pressurizer vessel 10 via pipes 450 and 460 which, in turn, attach to a pipe 470 for providing a piping connection of the valves to the pressurizer vessel. The pipe 470 attaches to the relief nozzle 70, which is illustrated in FIG. 1. The valves 430 and 440 are also connected to pipes 480 and 490 which merge into a pipe 500 for providing a piping connection to the pressurizer relief tank 210. The valves 430 and 440 are programmed to open at a preselected pressure, 420 psig in this embodiment.

After plant startup or shutdown is completed, plant operators manipulate the digital control panel 450 to close the valves 410 and 420 for isolating and deactivating the system of the present invention. The valves 430 and 440 function, during normal operation, as a safety relief mechanism for depressurization of the pressurizer vessel 10. When the pressure in the pressurizer vessel 10 reaches 420 psig, the valves 430 and 440 open to vent the excess pressure to the pressurizer relief tank 10.

However, before deactivating or activating the valves 410 and 420, an addition check may be implemented. A plant computer 510, which is typically already existing in many plants, is electrically connected to existing plant field sensors (i.e., the heaters 120 and other sensors which are not shown) on the pressurizer vessel 10, and receives temperature and pressure readings from these field sensors. The digital control panel 450 is electrically connected to the plant computer 510 for processing the information received from the plant computer (i.e., pressure and temperature). The digital control panel 450 checks for a predetermined temperature and pressure before manipulation of the valves 410 and 420 is permissible which allows or stops the automatic venting of the nitrogen from the pressurizer vessel 10 and insertion of the nitrogen into the pressurizer vessel 10. It will be obvious to those skilled in the art that the predetermined pressure and temperature will be determined by the particular plant. Once the predetermined conditions are met, the digital control panel 450 indicates via visual indicators (not shown) on the digital control panel 450 that the conditions are met. The operators may then manipulate the digital control panel 450 to send an electrical signal via the communication cables 460 and 470 to the valves 410 and 420 which, in turn, opens or closes the valves 410 and 420 according the signal received from the digital control panel 450.

It is thought that the present invention and many of its attendant advantages will be understood from the foregoing description and it will be apparent that various changes may be made without departing from the spirit and scope of the invention or sacrificing all of its material advantages, the form hereinbefore described being merely a preferred or exemplary embodiment thereof.

We claim:

1. An automated method for maintaining pressure within a nuclear power plant primary loop, the method comprising the steps of:

partially filling a portion of a pressurizer vessel, in fluid communication with the primary loop, with a liquid for maintaining pressure in the primary loop;

circulating a primary coolant through the primary loop with a reactor coolant pump while controlling the pressure in the pressurizer vessel bye:
    (i) automatically injecting an inert gas by a first automated device, operatively connected to the pressurizer vessel, into the pressurizer vessel when the pressure in the pressurizer vessel is less than a first predetermined pressure; and
    (ii) automatically venting the gas by a second automated device, operatively connected to the pressurizer vessel, from the pressurizer vessel when the pressure in the pressurizer vessel is greater than a second predetermined pressure; and circulating the primary coolant through the primary loop with a reactor coolant pump after:
    (i) sensing the pressure and the temperature in the pressurizer vessel; and
    (ii) isolating the first automated device and the second automated device from the pressurizer vessel when the sensed temperature and pressure in the pressurizer vessel is suitable for operating the primary loop with the automated devices offline.

2. The method as in claim 1, wherein nitrogen is injected into the pressurizer vessel.

3. The method as in claim 2, wherein said injecting of step (i) includes:

sensing the pressure of the primary coolant circulating through the primary loop by the first automated device; and initiating or terminating said injection step by the first automated device in response to the sensed pressure of the primary coolant.

4. The method as in claim 3, wherein said venting of step (ii) includes:

sensing the pressure of the primary coolant circulating through the primary loop by the second automated device; and initiating or terminating said venting step by the second automated device in response to the sensed pressure of the primary coolant.

5. The method as in claim 1, wherein the inert gas is injected by the first automated device at a first predetermined pressure of about 380 psig.

6. The method as in claim 5, wherein the inert gas is vented by the second automated device at a second predetermined pressure of about 400 psig.

7. The method as in claim 18 wherein the pressure is automatically controlled within a range of about 20 psi.

* * * * *